June 30, 1931.  W. E. STORY, JR  1,812,763
PHOTO ELECTRIC DEVICE
Original Filed April 6, 1925
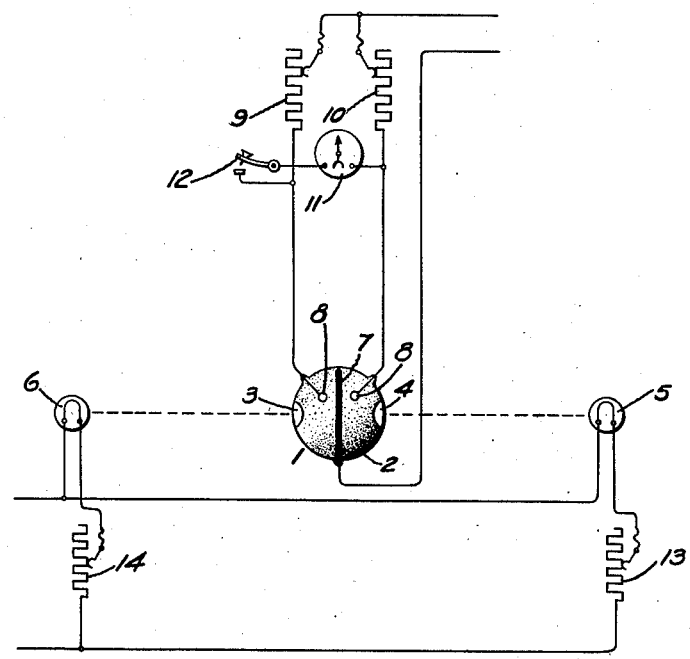
Inventor:
William E. Story, Jr:
by
His Attorney.

Patented June 30, 1931

1,812,763

UNITED STATES PATENT OFFICE

WILLIAM E. STORY, JR., OF WORCESTER, MASSACHUSETTS, ASSIGNOR TO GENERAL ELECTRIC COMPANY, A CORPORATION OF NEW YORK

PHOTO-ELECTRIC DEVICE

Application filed April 6, 1925, Serial No. 20,907. Renewed December 17, 1929.

My invention relates to photo-electric cells, and more particularly to the use of such cells as a means for comparing the intensities of light from two sources.

It is an object of my invention to provide means whereby the intensity of light from two sources may be compared by means of a photo-electric device in each of the two arms of a Wheatstone bridge, and in particular to compare the illumination from any lamp with that from a standard lamp in such a way as to avoid not only the visual comparison of illumination, but also some of the errors at present avoided only by the use of complicated and often unsatisfactory means.

When two photo-electric cells are employed to compare the intensity of light from two sources, the accuracy of the comparison depends upon a constant ratio of sensitivity of the two cells, and it is a further object of my invention to improve the constancy of this ratio.

With given terminal potential and given illumination the current thru a photo-electric cell depends almost entirely upon two factors, first on the condition of the sensitive surface, and second on the kind and pressure of the gas within the container. The gas pressure may change due to absorption by bombardment of the sensitive surface or by gas previously absorbed coming off again, or by a very slow leak, or by changes in temperature of different parts of the container. In order to cause such changes to affect both cells alike I have employed two cells in a single container. By the use of a double photo-electric cell the gas pressure and temperature will be alike on both sides of the cell and the ratio of the sensitivities of the two halves of the cell will, therefore, remain relatively constant.

The novel features which I believe to be characteristic of my invention are set forth with particularity in the appended claims. My invention itself, however, both as to its organization and method of operation will best be understood by reference to the following description taken in connection with the following drawing in which the figure shows diagrammatically the circuit organization whereby my invention may be carried into effect.

Referring to the drawing I have designated as 1 a photo-electric cell of substantially spherical form. A thin light-excluding metal film 2 covers the interior of the cell with the exception of two oppositely located windows 3 and 4 through which light may be admitted from a standard lamp 5 and a lamp 6, of the same type as a lamp to be tested. The cathode element 7 of the cell may comprise a substantially flat silver covered glass or else a metal plate this formation being coated on opposite sides thereof with a light-sensitive substance such as potassium and is supported centrally of the cell by means of wires, not shown. As thus disposed within the cell the light sensitive surfaces separate the cell into two compartments in such a way as to prevent an appreciable amount of either light or electrons in one compartment from reaching the other compartment, although space is allowed for equalization of gas pressure in the two compartments. The anodes 8 of the cell are located on opposite sides of the cathode 7 and are connected through resistances 9 and 10 to one of the leads of a direct current source of power. The other direct current lead is connected to the two light sensitive surfaces of the cathode 7. A galvanometer 11 and switch 12 are connected across the arms of the Wheatstone bridge in the usual manner. Variable resistances 13 and 14 connect the lamps to be compared with a common source of current supply.

In the operation of the device high resistances 9 and 10 are included in two of the arms of the Wheatstone bridge. The reading on the galvanometer is then reduced to zero by regulating the distance of lamp 6 from one of the cells, while maintaining the standard lamp 5 at a convenient fixed distance from the other cell, the light of each lamp being the only light falling on the corresponding cell. After this adjustment is made for zero current through the galvanometer the standard lamp 5 is replaced in turn by each of the lamps to be tested and the galvanometer reading again adjusted to zero by moving the lamps to be tested. The distance from the cell at which each lamp will give the same illumination as the standard lamp at the distance at which it was placed in the first comparison is thus determined and the relative illumination of the lamps are easily calculated or read off on a suitably graduated scale. In this manner the operator is relieved of the difficulty of judging light intensities, and any variation in the intensity of light from the two sources is indicated by the movement of the galvanometer needle.

By connecting the lamps to a common source the readings of the galvanometer are unaffected by small changes in line voltage. However, if the supply line is subject to wide fluctuations in voltage care should be taken to see that the conductivity of the cells is proportional to the light falling upon them for the potential and light range used. In general variations of line potential will cause the same changes in illumination of the two lamps if the lamps are of the same type and run at the same potential.

While the cathode sensitized on both sides divides the cell in such a way that neither light nor electrons in one compartment can get into the other compartment, such an arrangement, although in general desirable, is not necessary since the effect on one circuit by the constant light from the other lamp can be kept constant and the adjustment made for a constant additional light from the first lamp.

While I have shown a double photo-electric cell, two complete cells connected together by a tube would serve the same purpose except for inaccuracies which might be caused by unequal changes of temperature. Various other modifications in the manner of carrying my invention into effect will readily suggest themselves to persons skilled in the art without departing from the scope of my invention as set forth in the appended claims. These claims are directed to the system which includes the double photo-electric tube; claims on the tube, per se, are contained in the divisional application Serial No. 358,070, filed April 25, 1929 and entitled "Photo-electric devices".

What I claim as new and desire to secure by Letters Patent of the United States, is:—

1. In combination, light sensitive means including a pair of photo-electric cells contained in a single envelope, means whereby a pair of oppositely extending beams of light, one of which may be varied, may be directed onto said light sensitive means, a single source of energy for said light beams, and means connected to said light sensitive means for indicating variations in the intensities of said light beams.

2. In combination, two sources of light, a double photo-electric cell comprising a single container, each portion of said cell cooperating with one of said light sources, a common source of supply for said light sources whereby variations in light intensity, due to variations in the source of supply, occur simultaneously in both sources, and means connected to said cell for indicating variations in the relative intensities of the two light sources.

3. In combination, a photo-electric cell comprising a receptacle having a plurality of compartments, a window in each of said compartments, a light source disposed opposite each window whereby light may be a simultaneously directed onto the cell through said windows, and means connected to said cell for indicating relative intensities of said light sources.

4. In a device of the class described two sources of light, a common supply for said sources, a photo-electric device including two cells contained in the same envelope and cooperating with both of said sources, said device comprising two arms of a Wheatstone bridge.

5. In a device of the class described, a Wheatstone bridge, photo-electric cells having a predetermined relationship connected in different arms of said bridge, an electric lamp cooperating with one of said cells and a second electric lamp to be compared with said first light source cooperating with the other of said cells, and a common source of energy for said electric lamps.

In witness whereof, I have hereunto set my hand this 31st day of March, 1925.

WILLIAM E. STORY, Jr.